(12) United States Patent
Huang

(10) Patent No.: US 11,472,502 B1
(45) Date of Patent: Oct. 18, 2022

(54) BICYCLE CARRIER

(71) Applicant: YOTTA INNOVATION CO., LTD., Apia (WS)

(72) Inventor: Stella Huang, Taipei (TW)

(73) Assignee: Yotta Innovation Co., Ltd., Apia (WS)

( * ) Notice: Subject to any disclaimer, the term of this patent is extended or adjusted under 35 U.S.C. 154(b) by 0 days.

(21) Appl. No.: 17/221,542

(22) Filed: Apr. 2, 2021

(51) Int. Cl.
*B60R 9/10* (2006.01)
*B62H 3/06* (2006.01)

(52) U.S. Cl.
CPC ............... *B62H 3/06* (2013.01); *B60R 9/10* (2013.01)

(58) Field of Classification Search
CPC ......... B60R 9/10; B60R 9/06; Y10S 224/924; Y10T 403/599; Y10T 403/60; Y10T 403/602
USPC ......................................... 224/518–521, 924
See application file for complete search history.

(56) References Cited

U.S. PATENT DOCUMENTS

| | | | | |
|---|---|---|---|---|
| 2,971,777 A | * | 2/1961 | Weber | B60D 1/065 280/512 |
| 10,906,473 B1 | * | 2/2021 | Yu | B60R 9/06 |
| 11,148,607 B1 | * | 10/2021 | Hsieh | B60R 9/045 |
| 2019/0161022 A1 | * | 5/2019 | McFadden | B60R 9/10 |
| 2021/0009223 A1 | * | 1/2021 | Tsai | B62H 3/00 |

FOREIGN PATENT DOCUMENTS

JP 08277981 A * 10/1996 .............. F16L 37/18

* cited by examiner

*Primary Examiner* — Scott T McNurlen
(74) *Attorney, Agent, or Firm* — Muncy, Geissler, Olds & Lowe, P.C.

(57) ABSTRACT

A bicycle carrier is provided, including a base, a support rod assembly and a locking unit. The base has a plurality of first engaging portions. The support rod assembly is optionally rotatably disposed on the base. The locking unit includes a second engaging portion, a linkage mechanism, at least one positioning portion, a locking assembly and a controlling member. The linkage mechanism is disposed in the support rod assembly, the linkage assembly is respectively connected to the second engaging portion and the controlling member, the at least one positioning portion is disposed on the support rod assembly, the locking assembly is movably disposed on the controlling member, the controlling member controls the second engaging portion to be connected to the first engaging portion via the linkage mechanism, and the controlling member is positionably connected to the at least one positioning portion via the locking assembly.

8 Claims, 12 Drawing Sheets

BICYCLE CARRIER

BACKGROUND OF THE INVENTION

Field of the Invention

The present invention relates to a bicycle carrier.

Description of the Prior Art

A bicycle carrier is used to carry a bicycle to move with a car. When a user drives to a destination, s/he can ride the bicycle to enjoy the view or just exercise. Usually, the bicycle carrier has a foldable mechanism, so when the bicycle carrier is not used, the user can fold the bicycle carrier to be a smaller size for better storage, transportation, mounting or non-interference of car door opening.

However, the existing foldable mechanisms have simple pivot connection structures, so components can be easily moved by unexpected forces which may cause unnecessary risks and disturbance. Some of the bicycle carriers have positioning components on the pivot connection points, so the user has to grip on a swinging component with one hand and operate a positioning component with the other hand. It is inconvenient to operate and move the bicycle carrier.

The present invention has arisen to mitigate and/or obviate the afore-described disadvantages.

SUMMARY OF THE INVENTION

The major object of the present invention is to provide a bicycle carrier, a linkage mechanism is connected to a second engaging portion and a controlling member, a user can operate the controlling member to make the second engaging portion detached from a first engaging portion of a base, and through pulling the controlling member, a support rod assembly can be driven to rotate relative to the base. In addition, a locking assembly is disposed on the controlling member, so the user needs to unlock the controlling member first to move it.

To achieve the above and other objects, a bicycle carrier is provided, including a base, a support rod assembly and a locking unit. The base has a plurality of first engaging portions which are spacingly arranged; the support rod assembly is optionally rotatably disposed on the base; the locking unit includes a second engaging portion, a linkage mechanism, at least one positioning portion, a locking assembly and a controlling member, the linkage mechanism is movably disposed in the support rod assembly, the linkage assembly is respectively connected to the second engaging portion and the controlling member to make the second engaging portion and the controlling member to be in a comovement relationship, the controlling member is movable between a first position and a second position relative to the support rod assembly, when the controlling member is on the first position, the second engaging portion and one of the plurality of first engaging portions are engaged with each other on a rotation direction of the support rod assembly, the support rod assembly remains on a fixed position; when the controlling member is on the second position, the second engaging portion is detachable from one of the plurality of first engaging portions, the support rod assembly is rotatable relative to the base, the at least one positioning portion is disposed on the support rod assembly, the locking assembly is movably disposed on the controlling member; when the locking assembly and the at least one positioning portion are connected to each other, the controlling member is in a locked state, the controlling member remains on a fixed position relative to the support rod assembly; when the locking assembly is detached from the at least one positioning portion, the controlling member is in a released state, the controlling member is movable relative to the support rod assembly.

The present invention will become more obvious from the following description when taken in connection with the accompanying drawings, which show, for purpose of illustrations only, the preferred embodiment(s) in accordance with the present invention.

DETAILED DESCRIPTION OF THE PREFERRED EMBODIMENTS

Figure 1:
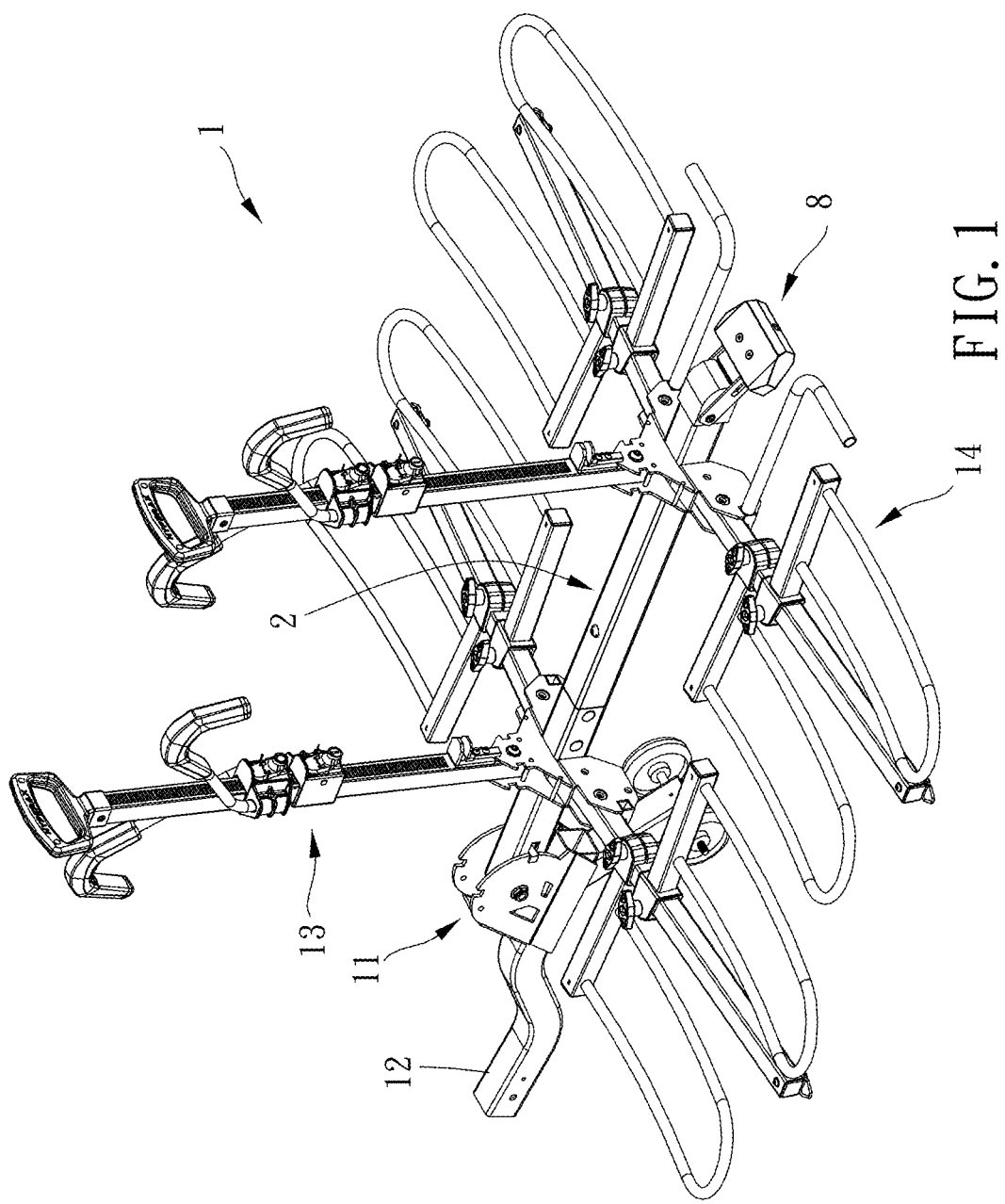
FIG. 1 is a stereogram of an embodiment of the present invention.
Figure 2:
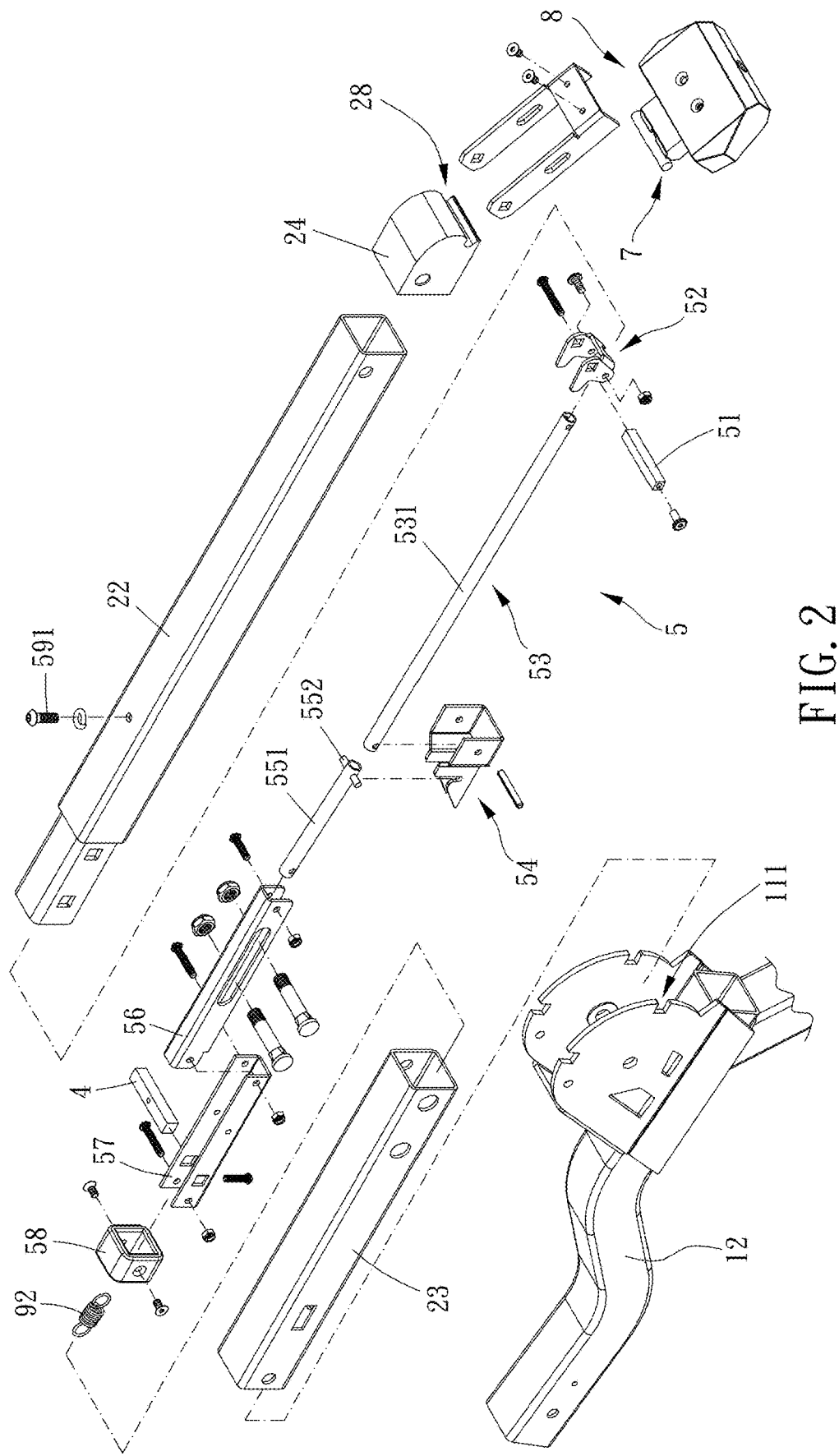
FIG. 2 is a breakdown view of FIG. 1.
Figure 3:
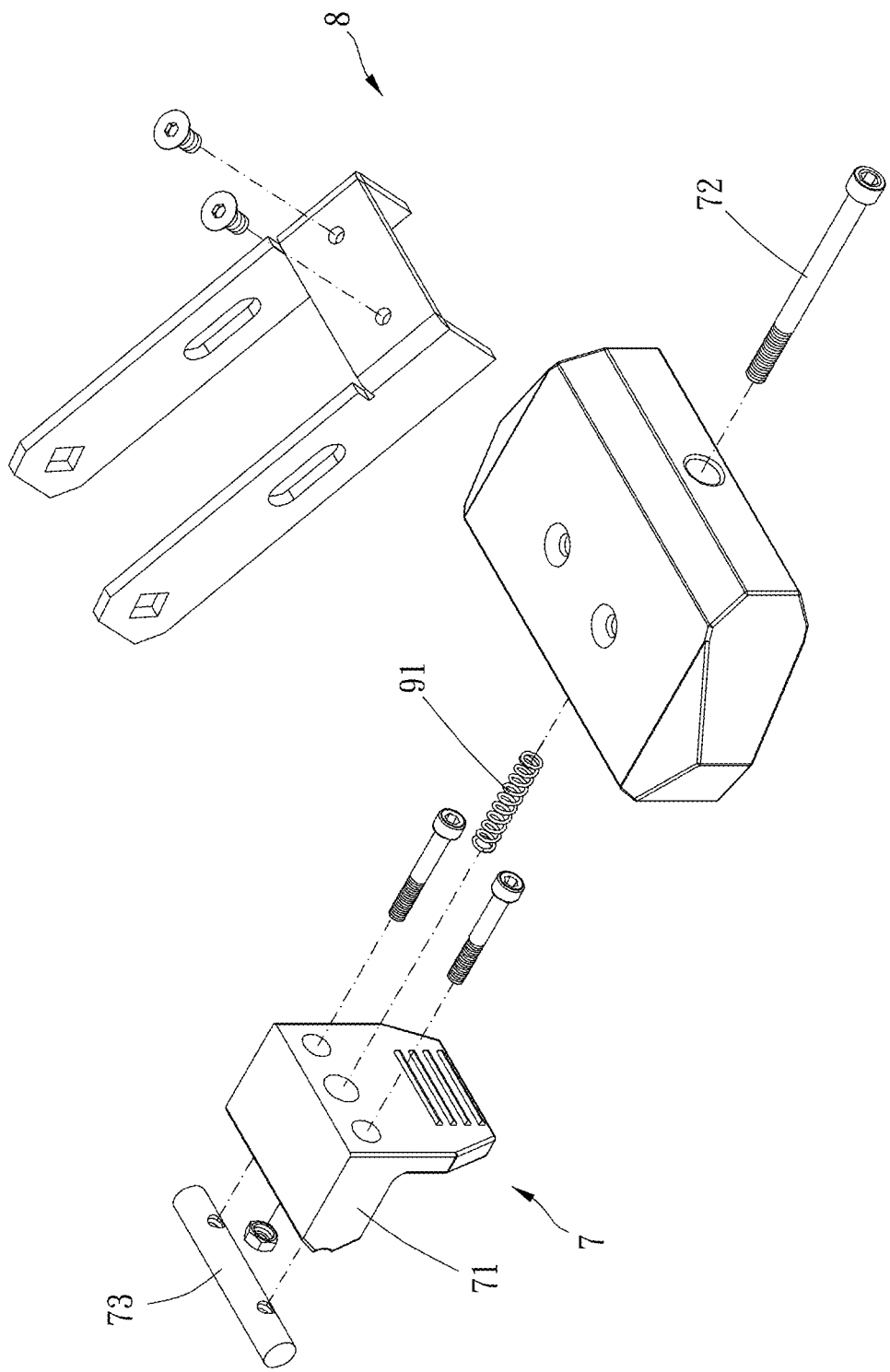
FIG. 3 is a breakdown view of a locking assembly and a controlling member of the embodiment of the present invention.
Figure 4:
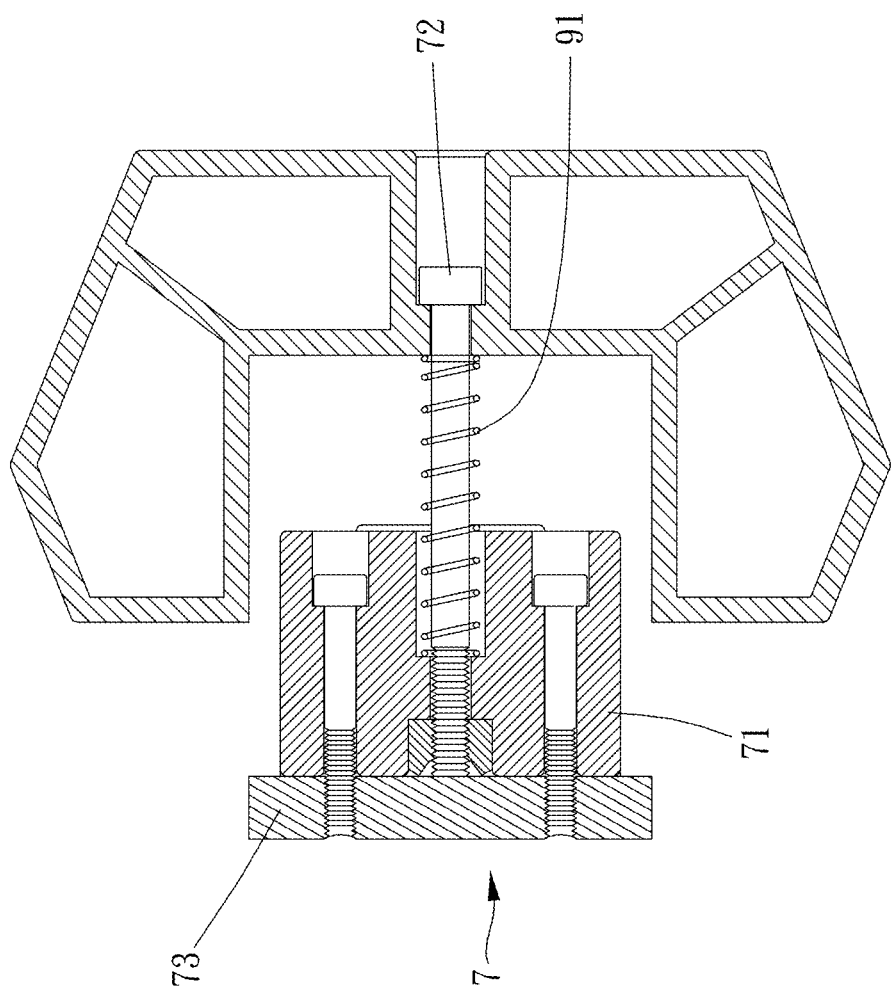
FIG. 4 is a cross-sectional view of the locking assembly and the controlling member of the embodiment of the present invention.
Figure 5:
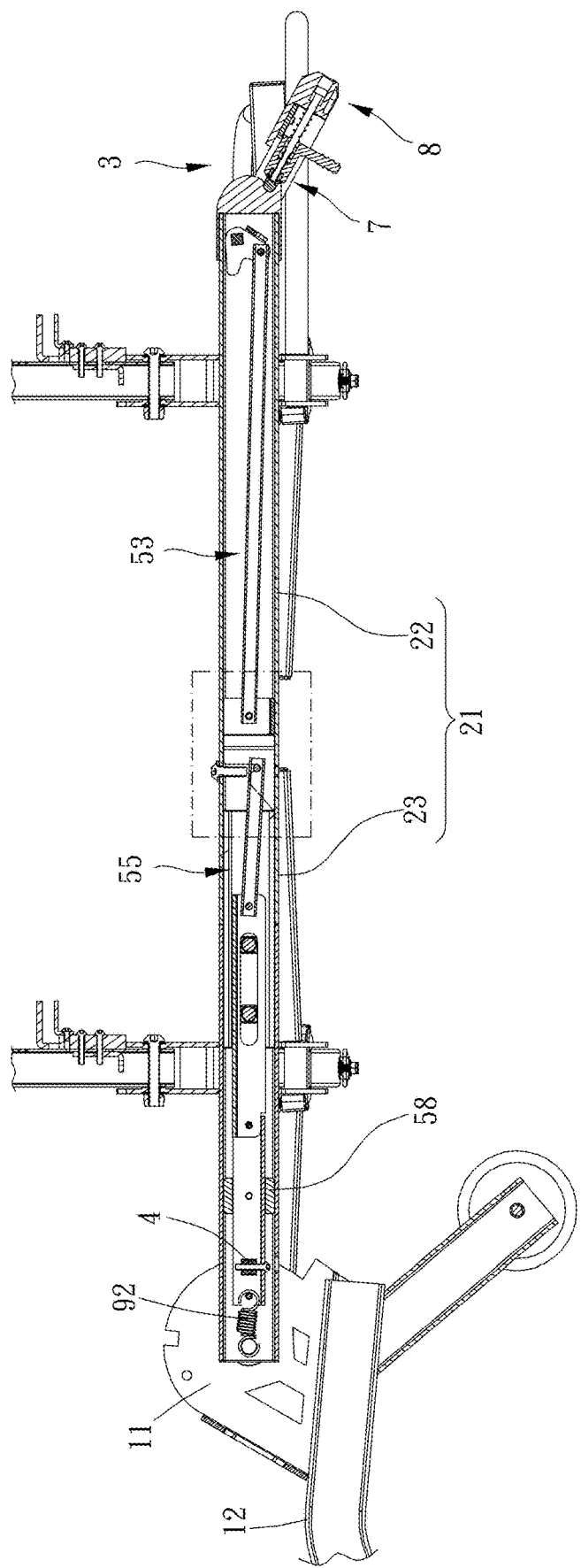
FIG. 5 is a cross-sectional view of FIG. 1.
Figure 6:
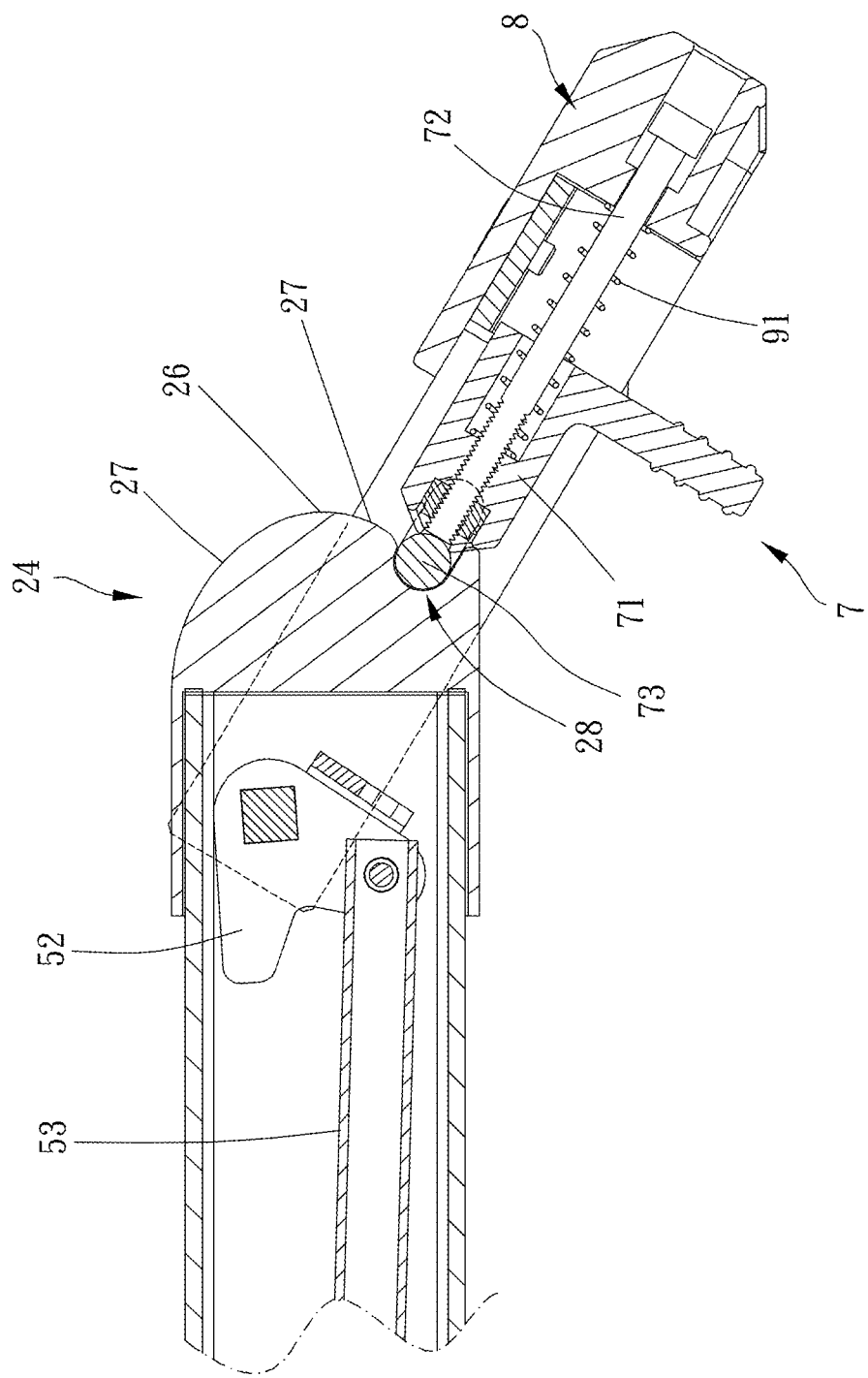
FIG. 6 is a drawing showing the controlling member of the embodiment of the present invention on a first position.
Figure 7:
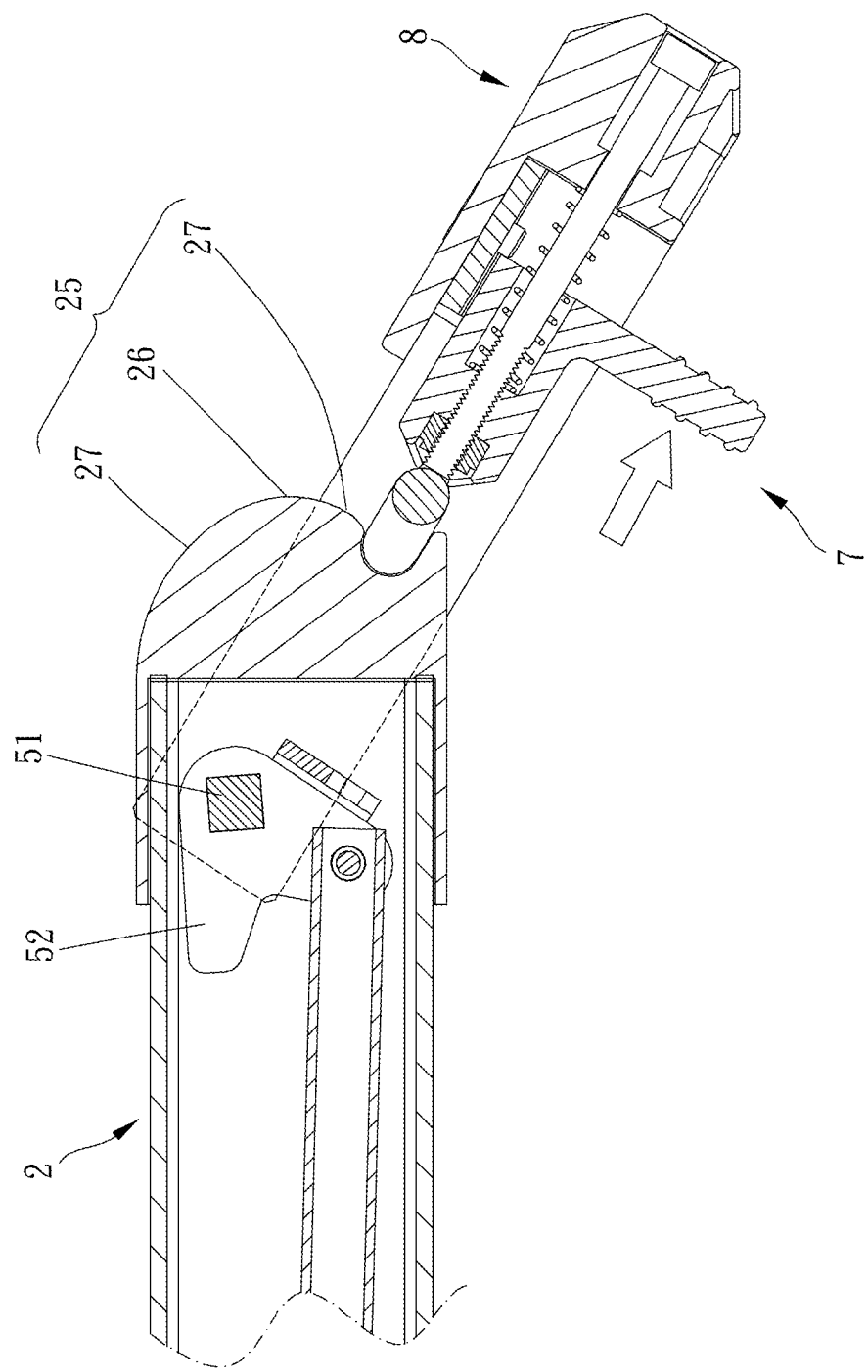
FIG. 7 is a drawing showing the locking assembly of the embodiment of the present invention moving to a released state.

The present invention will be clearer from the following description when viewed together with the accompanying drawings, which show, for purpose of illustrations only, the preferred embodiment in accordance with the present invention.

Please refer to FIGS. 1 to 12 for an embodiment. A bicycle carrier 1 includes a base 11, a support rod assembly 2 and a locking unit 3.

The base 11 has a plurality of first engaging portions 111 which are spacingly arranged, the support rod assembly 2 is optionally rotatably disposed on the base 11 to be configured to different positions, for example, a storage position or a usage position, for different requirements, and the locking unit 3 is used to keep the support rod assembly 2 to be on a fixed position. It is understandable that the bicycle carrier 1 further includes a connecting rod 12, at least one pressing lever assembly 13 and a plurality of carrying assemblies 14, the connecting rod 12 is for being connected to a bicycle body, the base 11 is positioned on the connecting rod 12, the plurality of carrying assemblies 14 are respectively assembled on the support rod assembly 2 to support a bicycle, and the at least one pressing lever assembly 13 is transverse to the plurality of carrying assemblies 14 and pivoted to the support rod assembly 2 to bias and position the bicycle.

Specifically, the locking unit 3 includes a second engaging portion 4, a linkage mechanism 5, at least one positioning portion 28, a locking assembly 7 and a controlling member 8, the linkage mechanism 5 is movably disposed in the support rod assembly 2, the linkage assembly 5 is respectively connected to the second engaging portion 4 and the controlling member 8 to make the second engaging portion 4 and the controlling member 8 to be in a comovement relationship, the controlling member 8 is movable between a first position and a second position relative to the support rod assembly 2, when the controlling member 8 is on the first position, the second engaging portion 4 and one of the plurality of first engaging portions 111 are engaged with each other on a rotation direction of the support rod assembly 2, and the support rod assembly 2 remains on a fixed position; when the controlling member 8 is on the second position, the second engaging portion 4 is detachable from one of the plurality of first engaging portions 111, and the support rod assembly 2 is rotatable relative to the base 11.

More specifically, the at least one positioning portion 28 is disposed on the support rod assembly 2, the locking assembly 7 is movably disposed on the controlling member 8, when the locking assembly 7 and the at least one positioning portion 28 are connected to each other, the controlling member 8 is in a locked state, and the controlling member 8 remains on a fixed position relative to the support rod assembly 2; when the locking assembly 7 is detached from the at least one positioning portion 28, the controlling member 8 is in a released state, and the controlling member 8 is movable relative to the support rod assembly 2.

In this embodiment, the locking assembly 7 is slidably arranged on the controlling member 8, the locking unit 7 has one said positioning portion 28, the positioning portion 28 is a recess, the support rod assembly 2 includes an arc section 25, the positioning portion 28 is recessed on the arc section 25, the locking assembly 3 further includes a first elastic member 91, and the first elastic member 91 abuts against and between the locking assembly 7 and the controlling member 8 to make the locking assembly 7 have a tendency to move toward the support rod assembly 2. Specifically, the locking assembly 7 is driven by the first elastic member 91 to bias against the arc section 25 normally, when the locking assembly 7 slides through the recess, the locking assembly 7 is automatically engaged within the recess and positioned; when the controlling member 8 is on the first position, the locking assembly 7 is engaged with the recess, and the controlling member 8 is in the locked position.

Therefore, through the controlling member 8 moving relative to the support rod assembly 2, the support rod assembly 2 can be controlled to be positioned on the base 11 or not. With a cooperation of the locking assembly 7 and the positioning portion 28, a user has to move the locking assembly 7 to be detached from the positioning portion 28 before moving the controlling member 8, and the user has to move the controlling member 8 to the released state before moving the controlling member 8 to the second position. The unlocking steps help to improve the operation safety and reliability and to ensure that the controlling member 8 is unmovable by unexpected forces. In addition, since the locking assembly 7 is disposed on the controlling member 8, the user can operate the controlling member 8 and the locking assembly 7 at the same time with only one hand.

Figure 8:
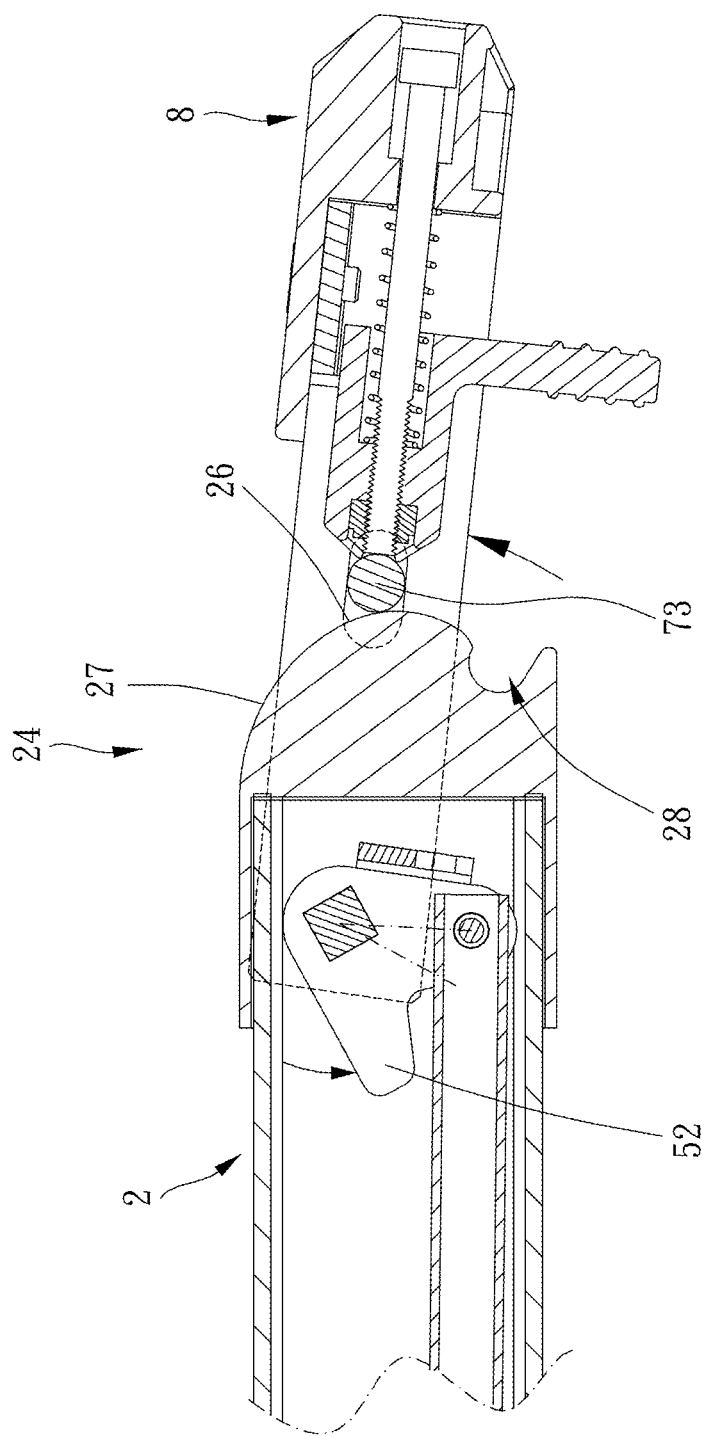
FIG. 8 is a drawing showing the controlling member of the embodiment of the present invention on a second position.
Figure 9:
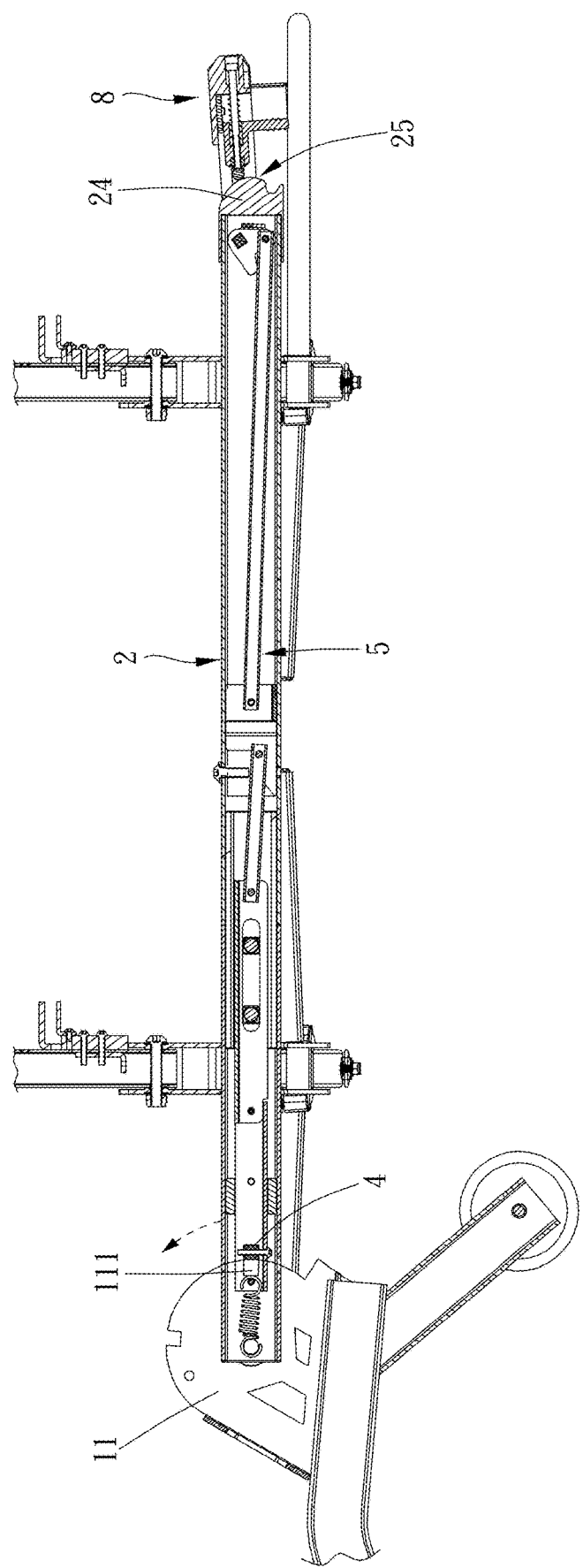
FIG. 9 is a drawing showing a second engaging portion of the embodiment of the present invention detached from a first engaging portion.
Figure 10:
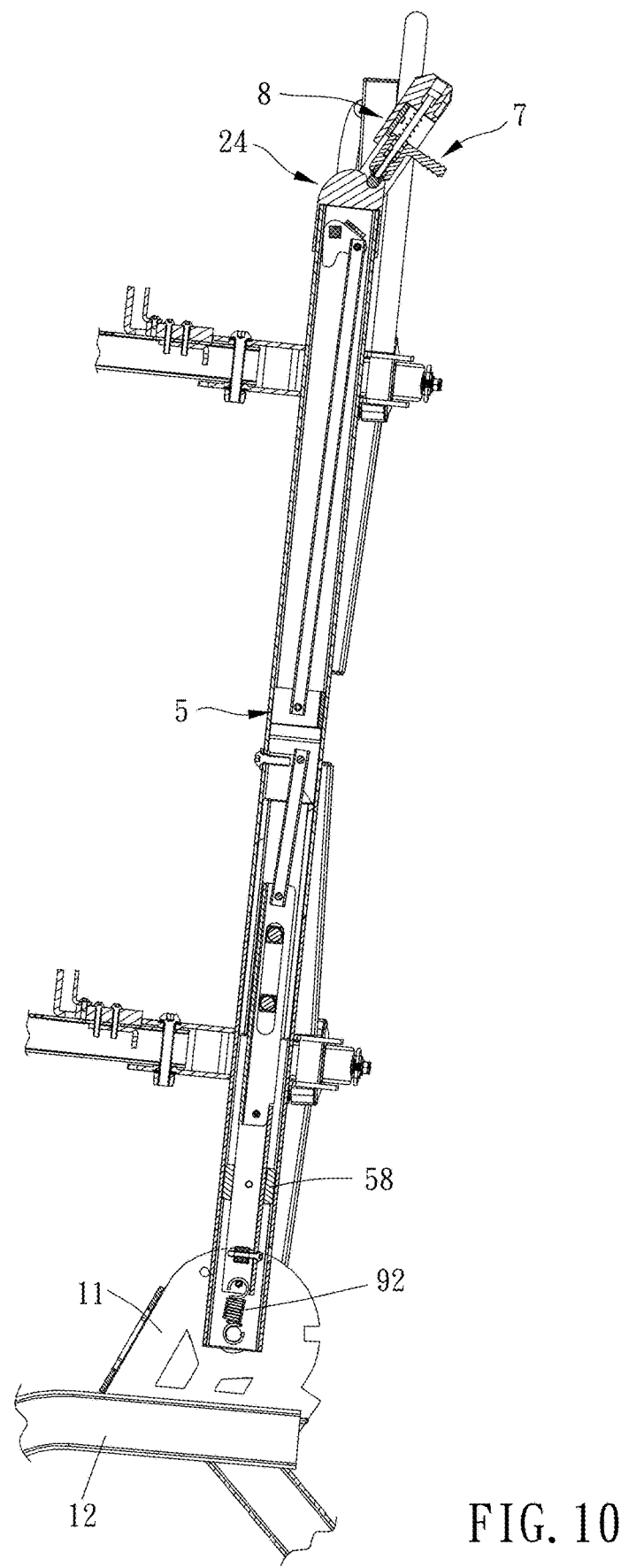
FIG. 10 is a drawing showing a support rod assembly of the embodiment of the present invention moving to another position relative to a base.

Preferably, the arc section 25 includes a top portion 26 and two slope portions 27, the two slope sections 27 are continuously connected to two opposite sides of the top portion 26, on an extension direction of the support rod assembly 2, the top portion 26 is farther from the base 11 than the two slope portions 27, and the positioning portion 28 is recessed on one of the two slope portions 27. As shown in FIG. 8, when the controlling member 8 is at the top portion 26, the locking assembly 7 is slidable along the two slope portions 27 to be automatically engaged within the positioning portion 28.

In this embodiment, the locking assembly 7 includes a handle 71, a slider 72 and a connecting member 73, the slider 72 is disposed through the controlling member 8, the handle 71 is slidably arranged on the slider 72, the first elastic member 91 is sleeved on the slider 72, two ends of the first elastic member 91 are respectively abutted against the handle 71 and the controlling member 8, and the connecting member 73 is detachably positioned on the handle 71 to be optionally engaged with the positioning portion 28. The connecting member 73 is positioned on the handle 71 with a screw member, and a part of the handle 71 protrudes beyond the controlling member 8 so that the user can pull the locking assembly 7 to move away from the support rod assembly 2 with fingers.

Specifically, the support rod assembly 2 further includes a rod body assembly 21 and a positioning base 24, the positioning base 24 is detachably assembled to the rod body assembly 21, the positioning base 24 has the arc section 25, and the positioning portion 28 is disposed on the positioning base 24. In addition, the rod body assembly 21 includes a first rod body 22 and a second rod body 23 which are inserted and connected to each other, the first rod body 22 and the second rod body 23 are respectively a rectangular rod, the first rod body 22 is greater than the second rod body 23 in length, the positioning base 24 is sleeved on the first rod body 22, and the second rod body 23 is pivoted to the base 11.

More specifically, the linkage mechanism 5 is received within the support rod assembly 2, the linkage mechanism 5 includes a connecting axle 51, a rotating member 52, a first linkage unit 53, a linkage base 54 and a second linkage unit 55, the connecting axle 51 is disposed through the support rod assembly 2 and connected to the rotating member 52 and the controlling member 8, the rotating member 52 and the controlling member 8 are in a co-rotation relationship with the connecting axle 51 as an axis, and a profile of the connecting axle 51 is preferably rectangular. One of two ends of the first linkage unit 53 is connected to the rotating member 52, the other of the two ends of the first linkage unit 53 and the second linkage unit 55 are respectively connected to two opposite sides of the linkage base 54 and slidable within the support rod assembly 2, and the second engaging portion 4 is disposed in the second linkage unit 55. During a process of the controlling member 8 rotating to the second position, the rotating member 52 simultaneously rotates to drive the first linkage unit 53, the linkage base 54 and the second linkage unit 55 to slide away from the base 11 to allow the second engaging portion 4 to be detached from the first engaging portion 111.

Preferably, a second elastic member 92 is connected to the support rod assembly 2 and the second linkage unit 55 to allow the first linkage unit 53, the linkage base 54 and the second linkage unit 55 to slide toward the base 11 normally, so the second engaging portion 4 can effectively resist unexpected forces to be automatically and stably engaged with the first engaging portion 111.

The linkage base 54 includes at least one restricting groove 541, an opening of the at least one restricting groove 541 faces the support rod assembly 2, one of the first linkage unit 53 and the second linkage unit 55 has at least one protrusion 552, and the at least one protrusion 552 is detachably engaged within the at least one restricting groove 541. In addition, the linkage base 54 further includes at least one guiding portion 542, the at least one restricting groove 541 is recessed on the at least one guiding portion 542, an extension direction of the at least one guiding portion 542 is oblique to an opening direction of the restricting groove 541, during the assembling process, the linkage base 54 and the at least one protrusion 552 only need to move toward each other face to face, and the at least one protrusion 552 is slidable into the at least one restricting groove 541 along the at least one guiding portion 542.

In this embodiment, there are two said restricting grooves 541, two said guiding portions 542 and two said protrusions 552, two said restricting grooves 541 and the two said guiding portions 542 are symmetrically arranged with a center line of the first rod body 22 as an axis, two said restricting grooves 541 and the two said guiding portions 542 are on a side of the positioning base 24 facing the second linkage unit 55, the second linkage unit 55 has two said protrusions 552, and two ends of the two said protrusions 552 are respectively engaged within the two restricting grooves 541.

Specifically, the first linkage unit 53 includes a first round rod 531 which has an outer diameter smaller than an inner diameter of the first rod body 22, the second linkage unit 55 includes a second round rod 551, a first element 56 and a second element 57, an outer diameter of the second round rod 551 is smaller than the inner diameter of the first round rod 22, a cross-section of the first element 56 and a cross-section of the second element 57 are respectively upside-down U-shaped, an opening of the first element 56 and an opening of the second element 57 face opposite directions to be engaged and pivoted to each other, the second engaging portion 4 is disposed through and positioned on the second element 57, the second element 57 is received within the second rod body 23, one of two ends of the second round rod 551 is pivoted to the first element 56, and the other of the two ends of the second round rod 551 has the two protrusions 552. The first linkage unit 53, the positioning base 24 and the second linkage unit 55 are connected to each other and pivotable relative to each other, so there are more allowance to ensure the components slide smoothly.

Preferably, the linkage mechanism 5 has a sleeve member 58, and the sleeve member 58 is sleeved on the second element 57 and abutted against an inner wall of the support rod assembly 2 to ensure that the second linkage unit 55 can slide stably along the second rod body 23.

Figure 11:
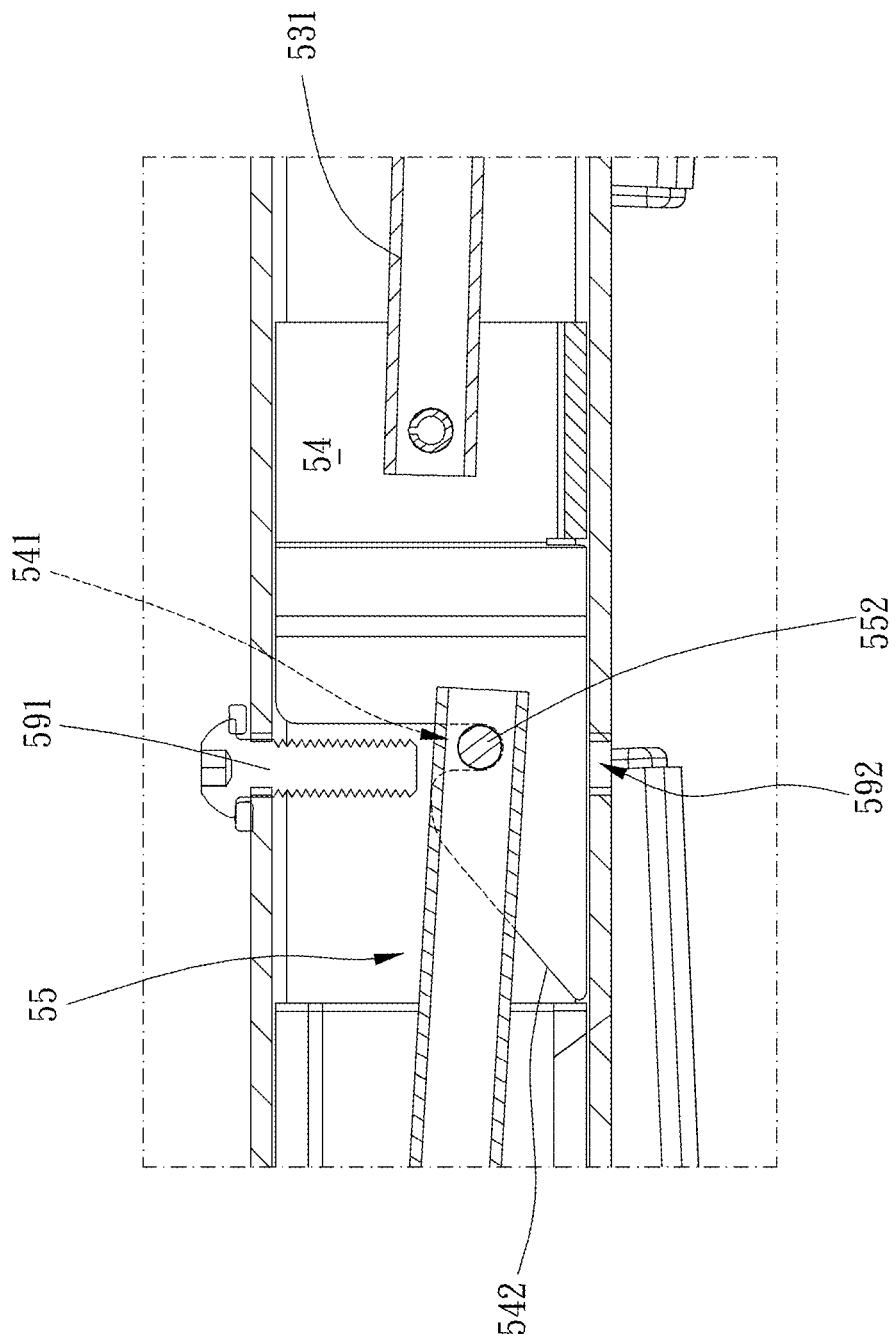
FIG. 11 is a partially enlarged view of FIG. 5.
Figure 12:
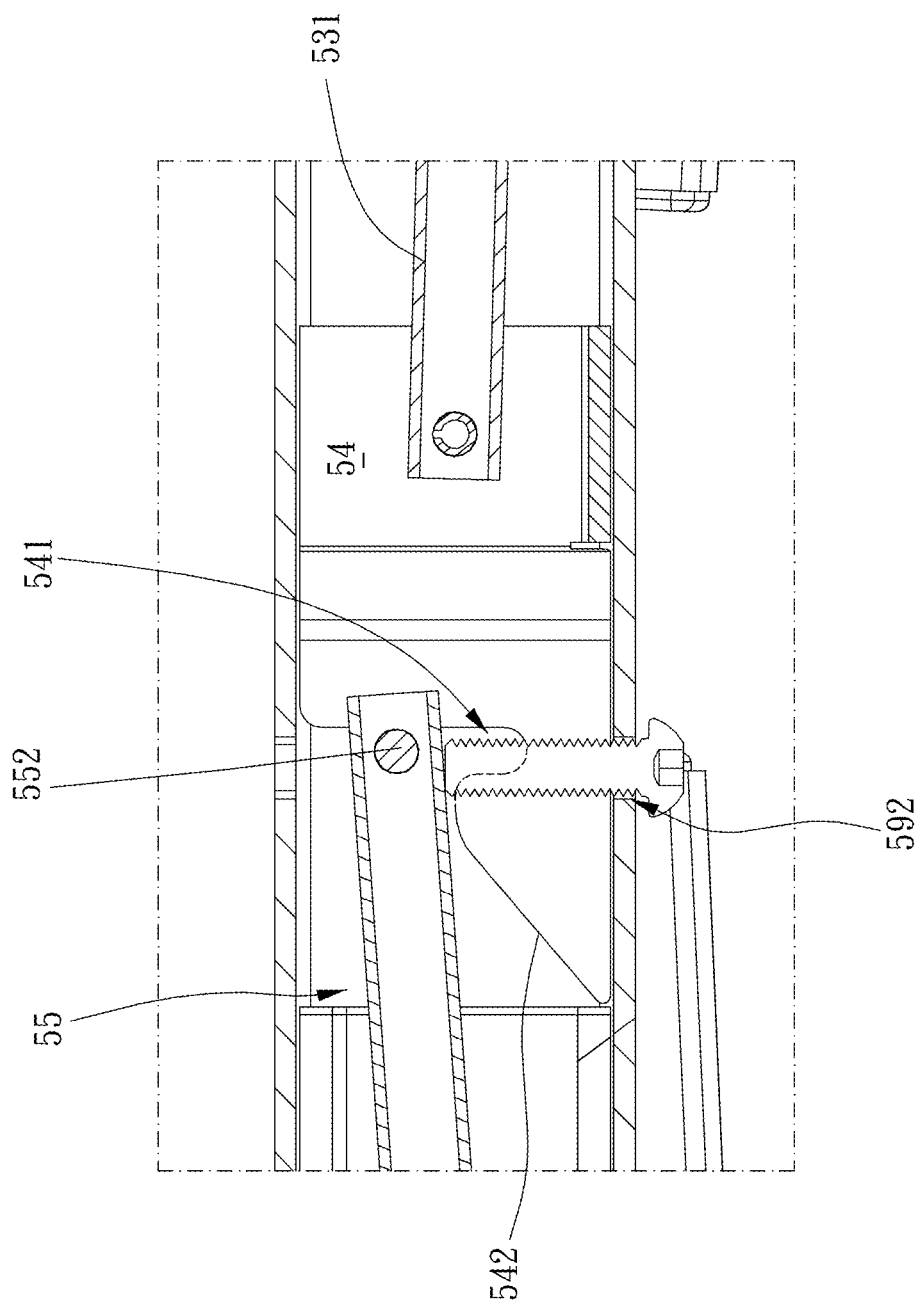
FIG. 12 is a drawing showing an operation making a protrusion of the embodiment of the present invention disengaged from a restricting groove.

It is to be noted that the linkage mechanism 5 includes at least one blocking member 591 and at least one detachment hole 592, the at least one blocking member 591 is disposed on a side of the support rod assembly 2 which faces the openings of the two restricting grooves 541, the at least one detachment hole 592 is disposed on a side of the support rod assembly 2 opposite to the openings of the two restricting grooves 541, as shown in FIG. 11, the least one blocking member 591 is used to block the second linkage unit 55 from moving toward the openings of the two restricting grooves 541 to keep the two protrusions 552 within the two restricting grooves 541, as shown in FIG. 12, the at least one detachment hole 592 is for an object to pass therethrough to drive the second linkage unit 55 to move toward the openings of the two restricting grooves 541 to allow the two protrusions 552 to be disengaged from the two restricting grooves 541. In this embodiment, there is one said blocking member 591 and one said detachment hole 592.

While we have shown and described various embodiments in accordance with the present invention, it should be clear to those skilled in the art that further embodiments may be made without departing from the scope of the present invention.

What is claimed is:

1. A bicycle carrier, including:
   a base, having a plurality of first engaging portions which are spacingly arranged;
   a support rod assembly, selectively rotatably disposed on the base; and
   a locking unit, including a second engaging portion, a linkage mechanism, at least one positioning portion, a locking assembly and a controlling member, the linkage mechanism movably disposed in the support rod assembly, the linkage assembly being respectively connected to the second engaging portion and the controlling member to make the second engaging portion and the controlling member to be in a comovement relationship, the controlling member being movable between a first position and a second position relative to the support rod assembly, when the controlling member is on the first position, the second engaging portion and one of the plurality of first engaging portions are engaged with each other on a rotation direction of the support rod assembly, the support rod assembly remains on a fixed position;
   when the controlling member is on the second position, the second engaging portion is detachable from one of the plurality of first engaging portions, the support rod assembly is rotatable relative to the base, the at least one positioning portion is disposed on the support rod assembly, the locking assembly is movably disposed on the controlling member; when the locking assembly and the at least one positioning portion are connected to each other, the controlling member is in a locked state, the controlling member remains on a fixed position relative to the support rod assembly;
   when the locking assembly is detached from the at least one positioning portion, the controlling member is in a released state, the controlling member is movable relative to the support rod assembly;
   wherein the locking unit further includes a first elastic member, and the first elastic member abuts against and between the locking assembly and the controlling member to make the locking assembly have a tendency to move toward the support rod assembly; and
   wherein the locking assembly is slidably arranged on the controlling member, the locking unit has one said positioning portion, the positioning portion is a recess, the support rod assembly includes an arc section, the positioning portion is recessed on the arc section, and the locking assembly is driven by the first elastic member to bias against the arc section normally; when the controlling member is on the first position, the locking assembly is engaged with the recess, and the controlling member is in the locked position.

2. The bicycle carrier of claim 1, wherein the support rod assembly further includes a rod body assembly and a positioning base, the positioning base is detachably assembled to the rod body assembly, and the at least one positioning portion is disposed on the positioning base.

3. The bicycle carrier of claim 1, wherein the arc section includes a top portion and two slope portions, the two slope portions are continuously connected to two opposite sides of the top portion, on an extension direction of the support rod assembly, the top portion is farther from the base than the two slope portions, and the positioning portion is recessed on one of the two slope portions.

4. The bicycle carrier of claim 3, wherein the support rod assembly further includes a rod body assembly and a positioning base, the positioning base is detachably assembled to the rod body assembly, and the at least one positioning portion is disposed on the positioning base; the linkage mechanism is received within the support rod assembly, the linkage mechanism includes a connecting axle, a rotating member, a first linkage unit, a linkage base and a second linkage unit, the connecting axle is disposed through the support rod assembly and connected to the rotating member and the controlling member, the rotating member and the controlling member are in a co-rotation relationship with the connecting axle as an axis, one of two ends of the first linkage unit is connected to the rotating member, the other of the two ends of the first linkage unit and the second linkage unit are respectively connected to two opposite sides of the linkage base and slidable within the support rod assembly, and the second engaging portion is disposed in the second linkage unit;

during a process of the controlling member rotating to the second position, the rotating member simultaneously rotates to drive the first linkage unit, the linkage base and the second linkage unit to slide away from the base to allow the second engaging portion to be detached from the first engaging portion; the linkage base includes at least one restricting groove, an opening of the at least one restricting groove faces the support rod assembly, one of the first linkage unit and the second linkage unit has at least one protrusion, and the at least one protrusion is detachably engaged within the at least one restricting groove; the linkage base further includes at least one guiding portion, the at least one restricting groove is recessed on the at least one guiding portion, an extension direction of the at least one guiding portion is oblique to an opening direction of the restricting groove, and the at least one protrusion is slidable into the at least one restricting groove along the at least one guiding portion; the linkage mechanism includes at least one blocking member and at least one detachment hole, the at least one blocking member is disposed on a side of the support rod assembly which faces the opening of the at least one restricting groove, the at least one detachment hole is disposed on a side of the support rod assembly opposite to the opening of the at least one restricting groove, the least one blocking member is used to block the second linkage unit from moving toward the opening of the at least one restricting groove to keep the at least one protrusion within the at least one restricting groove, and the at least one detachment hole is for an object to pass therethrough to drive the second linkage unit to move toward the opening of the at least one restricting groove to allow the at least one protrusion to be disengaged from the at least one restricting groove; the rod body assembly includes a first rod body and a second rod body which are inserted and connected to each other, the first rod body and the second rod body are respectively a rectangular rod, the first rod body is greater than the second rod body in length, the positioning base is sleeved on the first rod body, and the second rod body is pivoted to the base; the locking assembly includes a handle, a slider and a connecting member, the slider is disposed through the controlling member, the handle is slidably arranged on the slider, the first elastic member is sleeved on the slider, two ends of the first elastic member are respectively abutted against the handle and the controlling member, and the connecting member is detachably positioned on the handle to be selectively engaged with the positioning portion; the connecting member is positioned on the handle with a screw member, and a part of the handle protrudes beyond the controlling member; a profile of the connecting axle is rectangular; a second elastic member is connected to the support rod assembly and the second linkage unit to allow the first linkage unit, the linkage base and the second linkage unit to slide toward the base normally; there are two said restricting grooves, two said guiding portions and two said protrusions, the two said restricting grooves and the two said guiding portions are symmetrically arranged with a center line of the first rod body as an axis, two said restricting grooves and the two said guiding portions are on a side of the positioning base facing the second linkage unit, the second linkage unit has two said protrusions, and two ends of the two said protrusions are respectively engaged within the two restricting grooves;

there is one said blocking member and one said detachment hole; the first linkage unit includes a first round rod which has an outer diameter smaller than an inner diameter of the first rod body, the second linkage unit includes a second round rod, a first element and a second element, an outer diameter of the second round rod is smaller than the inner diameter of the first round rod, a cross-section of the first element and a cross-section of the second element are respectively upside-down U-shaped, an opening of the first element and an opening of the second element face opposite directions to be engaged and pivoted to each other, the second engaging portion is disposed through and positioned on the second element, the second element is received within the second rod body, one of two ends of the second round rod is pivoted to the first element, and the other of the two ends of the second round rod has the two protrusions; the linkage mechanism has a sleeve member, and the sleeve member is sleeved on the second element and abutted against an inner wall of the support rod assembly; the positioning base has the arc section; the bicycle carrier further includes a connecting rod, at least one pressing lever assembly and a plurality of carrying assemblies, the connecting rod is for being connected to a bicycle body, the base is positioned on the connecting rod, the plurality of carrying assemblies are respectively assembled on the support rod assembly to support a bicycle, and the at least one pressing lever assembly is transverse to the plurality of carrying assemblies and pivoted to the support rod assembly to bias and position the bicycle.

5. The bicycle carrier of claim 1, wherein the linkage mechanism is received within the support rod assembly, the linkage mechanism includes a connecting axle, a rotating member, a first linkage unit, a linkage base and a second linkage unit, the connecting axle is disposed through the support rod assembly and connected to the rotating member and the controlling member, the rotating member and the controlling member are in a co-rotation relationship with the connecting axle as an axis, one of two ends of the first linkage unit is connected to the rotating member, the other of the two ends of the first linkage unit and the second linkage unit are respectively connected to two opposite sides of the linkage base and slidable within the support rod assembly, and the second engaging portion is disposed in the second linkage unit; during a process of the controlling member rotating to the second position, the rotating member simultaneously rotates to drive the first linkage unit, the linkage base and the second linkage unit to slide away from the base to allow the second engaging portion to be detached from the first engaging portion.

6. The bicycle carrier of claim 5, wherein the linkage base includes at least one restricting groove, an opening of the at least one restricting groove faces the support rod assembly, one of the first linkage unit and the second linkage unit has at least one protrusion, and the at least one protrusion is detachably engaged within the at least one restricting groove.

7. The bicycle carrier of claim 1, wherein the locking assembly includes a handle, a slider and a connecting member, the slider is disposed through the controlling member, the handle is slidably arranged on the slider, and the connecting member is detachably positioned on the handle to be selectively engaged with the at least one positioning portion.

8. The bicycle carrier of claim 7, wherein the connecting member is positioned on the handle with a screw member, and a part of the handle protrudes beyond the controlling member.

* * * * *